United States Patent [19]

Cheron

[11] 4,037,022
[45] July 19, 1977

[54] FUEL CELL

[75] Inventor: Jacques Cheron, Maisons-Laffitte, France

[73] Assignee: Institut Francais du Petrole, France

[21] Appl. No.: 683,828

[22] Filed: May 6, 1976

[30] Foreign Application Priority Data

May 12, 1975   France ............................ 75.14941

[51] Int. Cl.² ........................................... H01M 8/04
[52] U.S. Cl. ................................................... 429/10
[58] Field of Search ...................................... 429/10

[56] References Cited

U.S. PATENT DOCUMENTS

| 3,597,278 | 8/1971 | Brimer | 429/10 |
| 3,661,652 | 5/1972 | Uitenbroek | 429/10 |

Primary Examiner—John H. Mack
Assistant Examiner—H. A. Feeley
Attorney, Agent, or Firm—Craig & Antonelli

[57] ABSTRACT

Fuel cell block comprising sealed compartments for fluid reactants and electrolyte, these compartments being delimited by plates, for example, the electrodes of the fuel cell.

At least some of the plates delimiting the compartments are subjected to magnetic attractive forces balancing the action of the pressing forces exerted on these plates by the fluid contained in the compartments.

9 Claims, 2 Drawing Figures

FUEL CELL

The present invention relates to a fuel cell and more particularly to upholding the plates delimiting compartments or chambers in a sealed fuel cell block.

As it is well known to those skilled in the art, a fuel cell comprises a sealed fuel cell block wherein plates, such as electrodes, delimit three types of compartments, i.e. first compartments for an electrolyte, second compartments for a comburent or combustion-sustaining fluid, and third compartments for a fuel. Such plates must be held in a predetermined relative position, to prevent any contact of adjacent plates.

These plates are usually of small thickness. Moreover the spacing of the plates is as small as possible in order to substantially reduce the weight of the fuel cell.

Wherever liquid or gaseous products are introduced into the compartments, pressure differences unavoidably appear between adjacent compartments, these pressure differences often being sufficient to produce electric short-circuits which are detrimental to the fuel cell.

The main object of the invention is accordingly to provide a fuel cell obviating these drawbacks. This new fuel cell will be described hereinunder with reference to the accompanying drawings wherein:

FIG. 1 is a diagrammatic cross sectional view of a fuel cell designated as whole by reference numeral 1.

Figure 1:
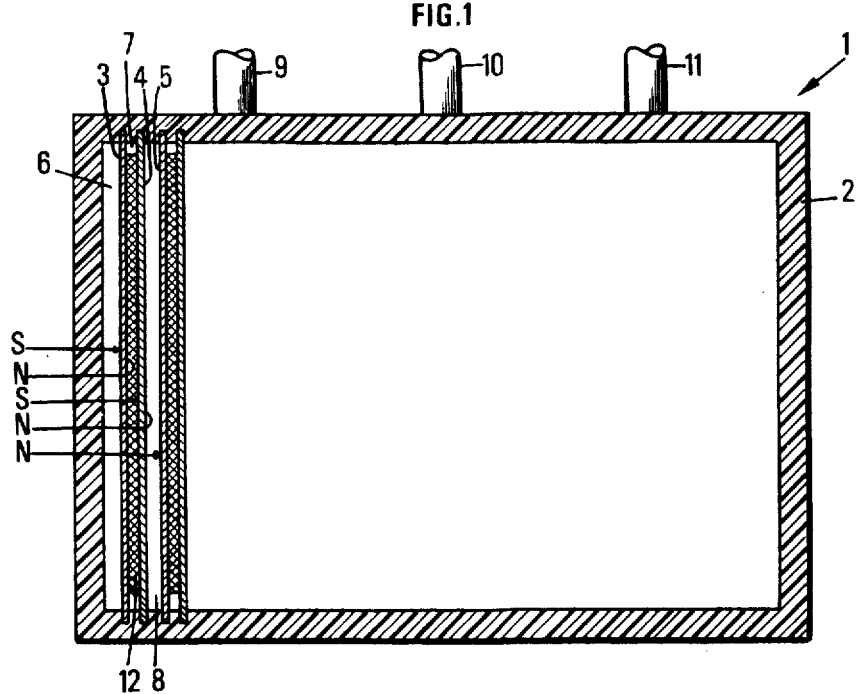
FIG. 1 is a diagrammatic cross section of a stack of plates constituting a fuel cell according to the invention.

This fuel cell comprises a sesaled block 2 wherein plates 3, 4, 5...etc delimit compartments, such as 6, 7 and 8, containing respectively a comburent or combustion-sustaining fluid, an electrolyte and a fuel. At least some of these plates, and particularly plates 3 and 4 which delimit the electrolyte compartments 7 are constituted by electrodes formed of a conducting grid having a face covered with a catalyst promoting the electro-chemical reactions in the fuel cell. The fuel cell block 2 is provided with orifices (not shown) which communicate with circuits diagrammatically shown with reference numerals 9, 10 and 11, feeding the compartments of fuel cell block 2 with comburent, electrolyte and fuel.

The electrolyte feeding the fuel cell is a liquid electrolyte, such as a solution of potassium hydroxide KOH, while comburent and fuel may be liquid reactants (methanol, hydrazine hydrate...), or gaseous reactants (pure oxygen, air hydrogen...).

The electrical connections between the different electrodes are not shown but they will be set, as known in the art, in accordance with the electrical characteristics of the fuel cell (voltage and intensity) which must be obtained.

Practically, even if the comburent, the electrolyte and the fuel feeding the fuel cell block are liquid, it is very difficult, if not impossible, to maintain strictly identical pressures in the various compartments. Each of the plates, such as 3, 4 and 5 is thus subjected to a pressure difference resulting in deformations which become higher as the thickness of the plate is reduced.

Consequently, the spacing of adjacent plates must be greater than the sum of their respective maximum deformations, to prevent formation, within the block 2, of short-circuits which would damage the fuel cell. There is thus a limit to the reduction of the spacing of adjacent plates with a view to reduce the size and weight of the fuel cell.

This drawback is obviated, according to the present invention, by providing the plates of the fuel cell block with grids made of a material previously subjected to a magnetic field and having a substantial magnetic remanence, or residual magnetization such as, for example, steels, commercially available magnetic alloys, etc. having a Curie's Point much higher than the operating temperature of the fuel cell.

The plates, which may be magnetized by any known method, are positioned as shown in FIG. 1 so that the opposite faces of the plates or electrodes 3 and 4 which delimit electrolytic compartments are of opposite magnetic polarities (S-N) and the opposite faces of the plates which delimit fuel compartments and comburent compartments are of identical magnetic polarities (N-N). An insulating separator, such as that diagrammatically shown at 12 in FIG. 1, is preferably positioned between the electrodes 3, 4 which delimit the electrolyte compartments.

This separator may be of any known type having a continuous porous structure, or a discontinuous structure permitting electrolyte circulation through the compartment 7. The thickness of the separator is chosen equal to the spacing to be maintained between electrodes 3 and 4. (In the figures the spacings between plates are not shown at a proper scale, for clarity of the drawing).

Under the action of the developed magnetic forces, the electrodes 3 and 4 attract each other and bear on the separator 9 which, though being of very small thickness, e.g. of the order of 0.1 mm or less, prevents any electrical contact between the electrodes 3 and 4.

At the same time appear between the plates which delimit fuel compartments or comburent compartments, repulsive magnetic forces which prevent these plates from moving towards each other, and thus prevent any undesired electrical contact there-between.

Magnetization of the plates is obtained by placing them in a magnetic field having a component in the direction of the plate thickness.

The intensity of the magnetizing field will be such that the resulting permanent magnetization of adjacent electrodes which delimit the electrolyte compartments develops between these electrodes attractive forces which are at least equal to the maximum pressing forces developed in the same compartments.

By way of example, for fuel cells of a current type, the magnetic forces will generally have a value of the order of a few tens of grams by $cm^2$.

Figure 2:
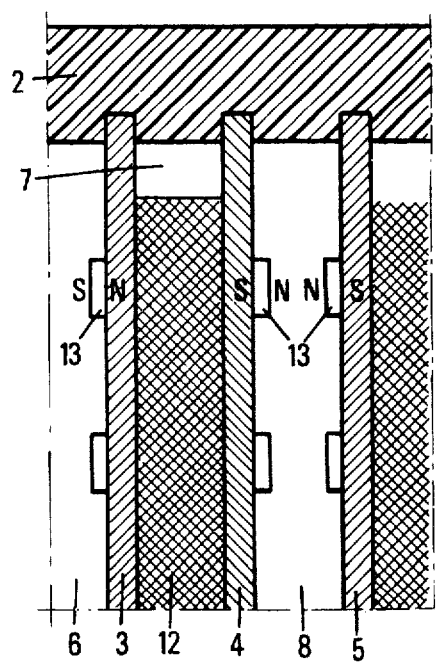
FIG. 2 illustrates an alternative embodiment of the invention.

In FIG. 2, showing an alternative embodiment, only plates 3, 4 and 5 have been illustrated.

In this embodiment, the magnetic attractive forces between plates 3 and 4 which delimit the electrolyte compartment 7 and the repulsive magnetic forces between plates such as 4 and 5 delimiting a fuel compartment and a comburent compartment, do not result from a prior magnetization of the plates but are developed by permanent magnets 13 which have been previously magnetized and are made integral with the plates for example by sticking. As apparent in FIG. 2, these magnets are of small size and of a thickness smaller than one half of that of the compartment wherein they are located. These magnets may have the shape of stripes, tablets, etc... They may be made of any known material having good magnetic properties, so that the attraction and repulsion forces will occur in the above-indicated conditions.

On may use commercially available magnetic alloys, ferrites, rubber strips embedding magnetic particles, etc. In such an embodiment, the plates such as 3, 4 and 5 need not to be made of a material of high magnetic properties.

Changes may be made without departing from the scope of the present invention.

For example in the case of FIG. 1 it will be possible to provide such a magnetization of the plates that any two adjacent plates attract each other, provided that the magnetic forces of attraction between the two plates such as 3 and 4, between which a separator 12 is located are at least equal to and preferably greater than the maximum pressure exerted by the fluid contained in this compartment on these plates or electrodes 3 and 4.

In the embodiment of FIG. 2, the magnets 13 of a plate may or may not face those carried by the adjacent plate.

In the embodiments illustrated by FIGS. 1 and 2 the separators 12 are located in the electrolyte compartments and the magnetic forces draw toward each other the plates which delimit these electrolyte compartments, but it is also possible to place the insulating separators in any compartment of the fuel cell block provided that the magnetic forces draw toward each other the plates delimiting the compartments wherein are located the separators and repel away from each other the plates which delimit the compartments not provided with a separator.

It will also be possible to build a fuel cell according to any of the above-described embodiments wherein only magnetic forces of attraction appear between the plates or electrodes which delimit the compartments where the separators are located, while no substantial force of repulsion or attraction is exerted on the plates which delimit the other compartments. Such an embodiment may, for example, be used when a compartment containing a reactant (comburent or fuel) is adjacent to two electrolyte compartments so as to provide in the fuel cell block 2 a sequence of compartments of the type: fuel compartment, electrolyte compartment, comburent compartment, etc...

I claim:

1. A fuel cell comprising a sealed block including a plurality of plates which delimit first compartments receiving a liquid electrolyte, second and third compartments receiving respectively a fluid fuel and a fluid comburent, means feeding said block with said liquid electrolyte, fluid fuel and fluid comburent, and means for subjecting at least some of the plates which delimit the compartments to magnetic attractive forces counteracting the action of pressing forces exerted on said plates by fluid contained in the compartments.

2. A fuel cell according to claim 1, comprising mechanical separators of selected thickness located between said plates subjected to said magnetic attractive forces.

3. A fuel cell according to claim 2, wherein means are provided for subjecting the adjacent plates of the fuel cell block having no separator there between to the action of magnetic repulsive forces preventing said adjacent plates from moving towards each other.

4. A fuel cell according to claim 1, wherein said magnetic force of attraction is at least equal to the maximum pressing force exerted on ther plates by the fluid contained in the compartment delimited by said plates subjected to the magnetic forces of attraction.

5. A fuel cell according to claim 4, wherein each plate of the fuel cell block comprises a grid made of a material of substantial magnetic remanence previously subjected to a magnetic field of predetermined intensity, said magnetic field having one component oriented in the direction of the thickness of said grid.

6. A fuel cell according to claim 4, wherein said means for subjecting at least some of the plates to magnetic attractive forces comprise small-sized elements integral with the plates, said elements being made of a material of substantial magnetic remanence previously placed in a magnetizing field.

7. A fuel cell according to claim 6, wherein the thickness of said elements is smaller than half the thickness of the compartments wherein they are located.

8. A fuel cell according to claim 2, wherein said magnetic force of attraction is at least equal to the maximum pressing force exerted on the plates by the fluid contained in the compartment delimited by said plates subjected to the magnetic forces of attraction.

9. A fuel cell according to claim 3, wherein said magnetic force of attraction is at least equal to the maximum pressing force exerted on the plates by the fluid contained in the compartment delimited by said plates subjected to the magnetic forces of attraction.

* * * * *